(12) United States Patent
Zou

(10) Patent No.: US 10,802,628 B2
(45) Date of Patent: Oct. 13, 2020

(54) SUBPIXEL UNIT, TOUCH UNIT, TOUCH DISPLAY PANEL AND TOUCH DISPLAY APPARATUS

(71) Applicant: BOE TECHNOLOGY GROUP CO., LTD., Beijing (CN)

(72) Inventor: Xiangxiang Zou, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 71 days.

(21) Appl. No.: 16/194,001

(22) Filed: Nov. 16, 2018

(65) Prior Publication Data
US 2019/0235679 A1 Aug. 1, 2019

(30) Foreign Application Priority Data
Jan. 31, 2018 (CN) .......................... 2018 1 0098197

(51) Int. Cl.
*G06F 3/041* (2006.01)
*G09G 3/32* (2016.01)
(Continued)

(52) U.S. Cl.
CPC ............ *G06F 3/0412* (2013.01); *G06F 3/044* (2013.01); *G06F 3/0416* (2013.01);
(Continued)

(58) Field of Classification Search
CPC .......... G06F 3/041; G06F 3/044; G06F 3/046; G06F 3/042; G06F 3/045; G06F 3/047; G06F 3/34; G09G 3/3241; G09G 3/36; G09G 3/32; G09G 3/3258; G09G 3/20; G09G 3/3291; G09G 3/325; G09G 3/3266; G09G 3/30; G09G 3/3233; H01L 27/28; H01L 27/32; H01L 51/52; H01L 51/50; H01L 51/56; H01L 25/16; G02F 1/1333; G02F 1/1362; G02F 1/13; G02F 1/136; G02F 1/1368; G02F 1/133; G02F 1/1335

See application file for complete search history.

(56) References Cited

U.S. PATENT DOCUMENTS

2006/0022909 A1* 2/2006 Kwak .................. G09G 3/3233
 345/76
2008/0150848 A1* 6/2008 Chung .................. G06F 3/0412
 345/82

(Continued)

*Primary Examiner* — Chanh D Nguyen
*Assistant Examiner* — Nguyen H Truong
(74) *Attorney, Agent, or Firm* — Thomas | Horstemeyer LLP (57) ABSTRACT

The present disclosure relates to a subpixel unit. The subpixel unit includes a drive unit configured to generate a drive current based on a data signal under control of a scanning signal. The subpixel unit include a first light-emitting unit connected to the drive unit and configured to emit light under drive of the drive current outputted from the drive unit, and a first switch unit configured to be enabled under control of a first control signal to transmit the drive current. The subpixel unit include a second light-emitting unit connected to the first switch unit and configured to emit light under drive of the drive current outputted from the first switch unit, and a second switch unit configured to be enabled under control of a second control signal to transmit a touch signal of an electrode of the second light-emitting unit.

5 Claims, 8 Drawing Sheets

(51) Int. Cl.
*G06F 3/044* (2006.01)
*G09G 3/3241* (2016.01)

(52) U.S. Cl.
CPC ........ *G06F 3/0443* (2019.05); *G06F 3/04166* (2019.05); *G09G 3/3241* (2013.01); *G06F 2203/04103* (2013.01)

(56) References Cited

U.S. PATENT DOCUMENTS

| | | | |
|---|---|---|---|
| 2013/0293499 A1* | 11/2013 | Chang | G06F 3/041 345/173 |
| 2015/0035798 A1* | 2/2015 | Zhou | G09G 3/3266 345/174 |
| 2017/0229056 A1* | 8/2017 | Li | G09G 3/2092 |
| 2018/0113531 A1* | 4/2018 | Na | G09G 3/2092 |

* cited by examiner

SUBPIXEL UNIT, TOUCH UNIT, TOUCH DISPLAY PANEL AND TOUCH DISPLAY APPARATUS

CROSS REFERENCE

This application is based upon and claims priority to Chinese Patent Application No. 201810098197.5, filed on Jan. 31, 2018, the entire contents thereof are incorporated herein by reference.

TECHNICAL FIELD

The present disclosure relates to the field of display, and more particularly, to a subpixel unit, a touch unit including the subpixel unit, a touch display panel including the touch unit, and a touch display apparatus including the touch display panel.

BACKGROUND

In recent years, electronic products have been rapidly upgraded from previous key input to the current touch input, and more and more electronic products are equipped with display panels with touch functions. Therefore, the touch display panels are also required to be light, thin, short, and slim, just like the electronic products.

It is to be noted that the above information disclosed in this Background section is only for enhancement of understanding of the background of the present disclosure and therefore it may contain information that does not form the related art that is already known to a person of ordinary skill in the art.

SUMMARY

The present disclosure provides a subpixel unit, a touch unit, a touch display panel, and a touch display apparatus.

Other features and advantages of the present disclosure will become apparent from the following detailed description, or in part, by practice of the present disclosure.

According to an aspect of the present disclosure, there is provided a subpixel unit. The subpixel unit includes a drive unit configured to generate a drive current based on a data signal under control of a scanning signal. The subpixel unit includes a first light-emitting unit connected to the drive unit and configured to emit light under drive of the drive current outputted from the drive unit. The subpixel unit includes a first switch unit connected to the drive unit and configured to be enabled under control of a first control signal to transmit the drive current. The subpixel unit includes a second light-emitting unit connected to the first switch unit and configured to emit light under drive of the drive current outputted from the first switch unit. The subpixel unit includes a second switch unit connected to the second light-emitting unit and configured to be enabled under control of a second control signal to transmit a touch signal of an electrode of the second light-emitting unit.

In an exemplary arrangement of the present disclosure, a first terminal of the first switch unit is connected with an anode of the second light-emitting unit, a second terminal of the first switch unit is connected with the drive unit, and a control terminal of the first switch unit is connected with a first signal line.

A first terminal of the second switch unit is connected with a touch wire, a second terminal of the second switch unit is connected with the anode of the second light-emitting unit, and a control terminal of the second switch unit is connected with a second signal line.

A first terminal of the drive circuit is connected with the second terminal of the first switch unit and an anode of the first light-emitting unit, a second terminal of the drive circuit is connected with a scanning line, a third terminal of the drive circuit is connected with a data line, and a fourth terminal of the drive circuit is connected with a voltage source.

In an exemplary arrangement of the present disclosure, the first switch unit and the second switch unit are thin film transistors of different doping types.

In an exemplary arrangement of the present disclosure, an arrangement of the first light-emitting unit and the second light-emitting unit is any one of a top-bottom arrangement, a left-right arrangement, a finger insertion arrangement, and a concentric circle arrangement.

According to an aspect of the present disclosure, there is provided a touch unit. The touch unit includes a touch sensing electrode. The touch unit includes a touch drive electrode.

The touch sensing electrode includes at least one electrode of the above subpixel unit, and/or the touch drive electrode includes at least one electrode of the above subpixel unit.

In an exemplary arrangement of the present disclosure, the touch sensing electrode and/or the touch drive electrode includes a plurality of series-connected electrodes of the subpixel unit.

In an exemplary arrangement of the present disclosure, the electrode of the subpixel unit are formed by the anode of the second light emitting unit.

In an exemplary arrangement of the present disclosure, the electrode of the subpixel unit are formed by a cathode of the second light emitting unit.

According to an aspect of the present disclosure, there is provided a drive method, which is applied to the touch unit. The drive method includes a touch period. An electrode of the second light-emitting unit provides a touch signal to the touch drive electrode to determine a touch coordinate point by detecting a capacitance variation of the touch sensing electrode.

In an exemplary arrangement of the present disclosure, the drive method further includes a display period. The drive unit outputs a drive current to drive the first light-emitting unit or drive the first light-emitting unit and the second light-emitting unit to emit light.

In an exemplary arrangement of the present disclosure, when the touch period is overlapped with the display period, the drive unit outputs the drive current to the first light-emitting unit based on the data signal, such that the first light-emitting unit emits light; and an electrode of the second light-emitting unit transmits the touch signal to the touch drive electrode to determine the touch coordinate point by detecting the capacitance variation of the touch sensing electrode.

In an exemplary arrangement of the present disclosure, when the touch period is not overlapped with the display period, in the display period, the first light-emitting unit and the second light-emitting unit emit light under drive of the drive current outputted from the output unit; and in the touch period, an electrode of the second light-emitting unit transmits the touch signal to the touch drive electrode to determine the touch coordinate point by detecting the capacitance variation of the touch sensing electrode.

In an exemplary arrangement of the present disclosure, the first switch unit and the second switch unit are thin film transistors of different doping types and receive signals from a same signal line.

According to an aspect of the present disclosure, there is provided a method for fabricating a subpixel unit, which is applied to the above subpixel unit. The method includes forming a first signal line layer on a substrate, the first signal line layer comprising a scanning signal line and a control signal line. The method includes forming a second signal line layer on the first signal line layer. The second signal line layer includes a data line, a touch sensing electrode line, and sources and drains of the first switch unit and the second switch unit. The method includes forming a third signal line layer on the second signal line layer. The third signal line layer includes anodes of the first light-emitting unit and the second light-emitting unit. The method includes forming a fourth signal line layer on the third signal line layer. The fourth signal line layer includes a touch drive electrode line.

According to an aspect of the present disclosure, there is provided a touch display panel, which includes the above touch unit.

According to an aspect of the present disclosure, there is provided a touch display apparatus, which includes the above touch display panel.

It should be understood that the above general description and the detailed description below are merely exemplary and explanatory, and do not limit the present disclosure.

BRIEF DESCRIPTION OF THE DRAWINGS

The accompanying drawings herein are incorporated in and constitute a part of this specification, illustrate arrangements conforming to the present disclosure and together with the description serve to explain the principles of the present disclosure. Apparently, the accompanying drawings in the following description show merely some arrangements of the present disclosure, and persons of ordinary skill in the art may still derive other drawings from these accompanying drawings without creative efforts.

DETAILED DESCRIPTION

Exemplary arrangements will now be described more comprehensively by referring to accompanying drawings. However, the exemplary arrangements can be embodied in many forms and should not be construed as limited to the arrangements set forth herein; rather, these arrangements are provided so that this disclosure will be made thorough and complete, and the concept of exemplary arrangements will be fully conveyed to those skilled in the art. Furthermore, the described features, structures, or characteristics may be combined in any suitable manner in one or more arrangements. In the following description, numerous specific details are provided to provide a thorough understanding of the arrangements of the present disclosure. Those skilled in the art will recognize, however, that the technical solution of the present disclosure may be practiced without one or more of the specific details described, or that other methods, components, materials, etc. may be employed. In other instances, well-known technical solutions are not shown or described in detail to avoid obscuring aspects of the present disclosure.

The terms "one", "a", "the" and "said" used in this specification are intended to mean that there exists one or more elements/constituent parts/etc. The terms "comprising" and "having" are intended to be inclusive and mean that there may be additional elements/constituent parts/etc. other than the listed elements/constituent parts/etc. Moreover, the terms "first" and "second" are used merely as labels, and are not intended to impose numerical limitations on their objects.

In addition, the accompanying drawings are merely exemplary illustration of the present disclosure, and are not necessarily drawn to scale. The same reference numerals in the drawings denote the same or similar parts, and thus repeated description thereof will be omitted. Some block diagrams shown in the figures are functional entities and not necessarily to be corresponding to a physically or logically individual entities.

In related technologies of this art, mainly there are two technologies for integrating touch in a display apparatus as below: (1) fabricating a touch electrode on one side of encapsulating glass; and (2) directly dividing a cathode to form a touch electrode, and implementing display and touch by means of time division drive.

For the technology (1), it is necessary to additionally add at least one layer of electrode layer, which makes the manufacturing process more complicated and the manufacturing cost higher.

For the technology (2), cutting a cathode strip is high in process difficulty, and generally cutting the cathode strip is implemented through etching or making an inverted trapezoidal PS wall. However, the etching may destroy the existing organic electroluminescent layer and have a negative effect on the luminous efficiency, and cutting the cathode strip by using the inverted trapezoidal PS wall may cause a problem of incomplete partitioning, etc. Moreover, the display effect of cutting the cathode strip is not good, cut blocks can be seen with naked eyes, and non-time-division cannot be implemented.

Figure 1:
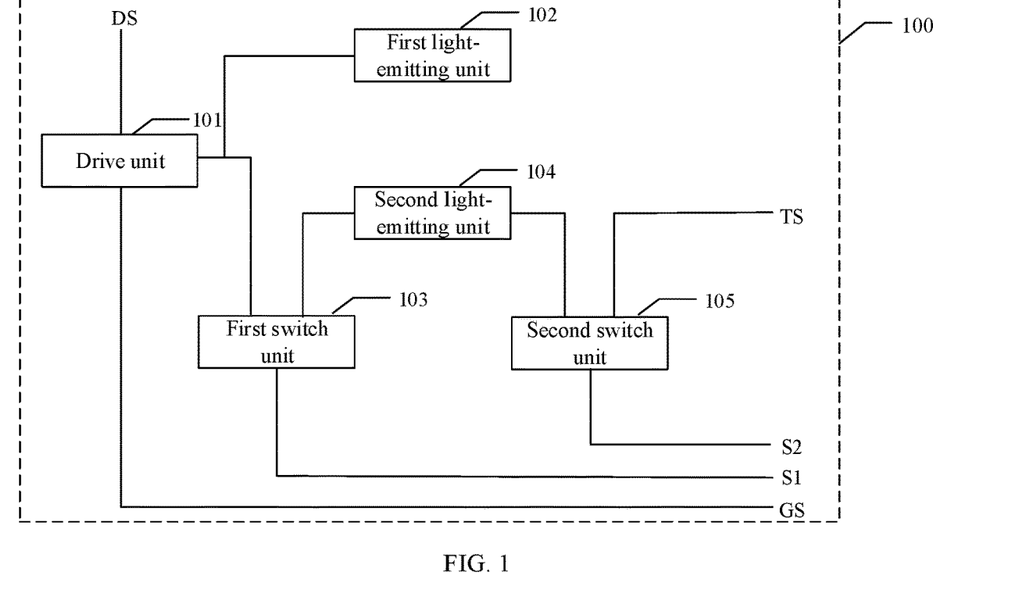
FIG. 1 illustrates a schematic structural diagram of a subpixel unit according to an exemplary arrangement of the present disclosure.

In view of problems in the related technologies, this exemplary arrangement first provides a subpixel unit. FIG. 1 illustrates a schematic structural diagram of the subpixel unit. As shown in FIG. 1, the subpixel unit 100 includes a drive unit 101, a first light-emitting unit 102, a first switch unit 103, a second light-emitting unit 104, and a second switch unit 105. The drive unit 101 is configured to generate a drive current based on a data signal (DS) under control of a scanning signal (GS). The first light-emitting unit 102 is connected to the drive unit 101 and is configured to emit light under drive of the drive current outputted from the drive unit 101. The first switch unit 103 is connected to the drive unit 101 and is configured to be enabled under control of a first control signal (SW1) to transmit the drive current. The second light-emitting unit 104 is connected to the first switch unit 103 and is configured to emit light under drive of the drive current outputted from the first switch unit 103. The second switch unit 105 is connected to the second light-emitting unit 104 and is configured to be enabled under control of a second control signal (SW2) to transmit a touch signal of an electrode of the second light-emitting unit 104.

In the display period, the subpixel unit 100 in the present disclosure drives the first light-emitting unit 102 and the second light-emitting unit 104 to emit light by driving the drive unit 101 and the first switch unit 103. In the touch period, the subpixel unit 100 controls a touch signal of an electrode of the second light-emitting unit 104 by controlling the second switch unit 105. When the display period does not overlap with the touch period, display and touch may be asynchronously implemented. When the display period overlaps with the touch period, display and touch may be synchronously implemented. Furthermore, the electrode of the second light-emitting unit 104 in the subpixel unit 100 also is used as a touch electrode of a touch sensor. The touch sensor is built in the touch display panel, which reduces the thickness of the touch display apparatus and improves light transmittance the display effect of the touch display panel.

In this exemplary arrangement, the first switch unit 103 and the second switch unit 105 may be triodes, metal-oxide field-effect transistors or thin film transistors, or may be switch elements frequently used in the art, which are not specifically limited in the present disclosure. In this exemplary arrangement, reference is made by taking an example in which the thin film transistor is used as the switch element.

Figure 2:
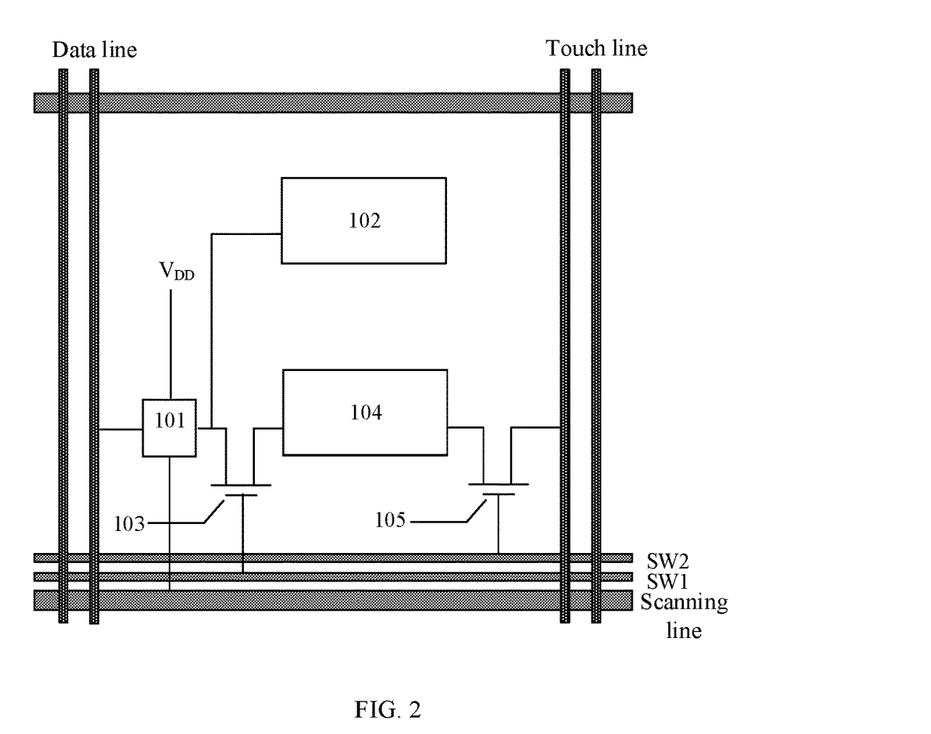
FIG. 2 illustrates a schematic diagram of a circuit structure of the subpixel unit according to an exemplary arrangement of the present disclosure.

FIG. 2 illustrates a circuit structure diagram of the subpixel unit 100. A first terminal of the first switch unit 103 connects an anode of the second light-emitting unit 104, a second terminal of the first switch unit 103 connects the drive unit 101, and a control terminal of the first switch unit 103 connects a first signal line SW1. A first terminal of the second switch unit 105 connects a touch wire, a second terminal of the second switch unit 105 connects the anode of the second light-emitting unit 104, and a control terminal of the second switch unit 105 connects a second signal line SW2. A first terminal of the drive circuit 101 connects the second terminal of the first switch unit 103 and an anode of the first light-emitting unit 102, a second terminal of the drive circuit 101 connects a scanning line, a third terminal of the drive circuit 101 connects a data line, and a fourth terminal of the drive circuit 101 connects a voltage source $V_{DD}$.

In this exemplary arrangement, the first terminal of the first switch unit 103 may be a drain of the thin film transistor, and the second terminal of the first switch unit 103 may be a source of the thin film transistor. The first terminal of the second switch unit 105 may be the drain of the thin film transistor, and the second terminal of the second switch unit 105 may be the source of the thin film transistor. However, the present disclosure is not specifically limited thereto.

Figure 3:
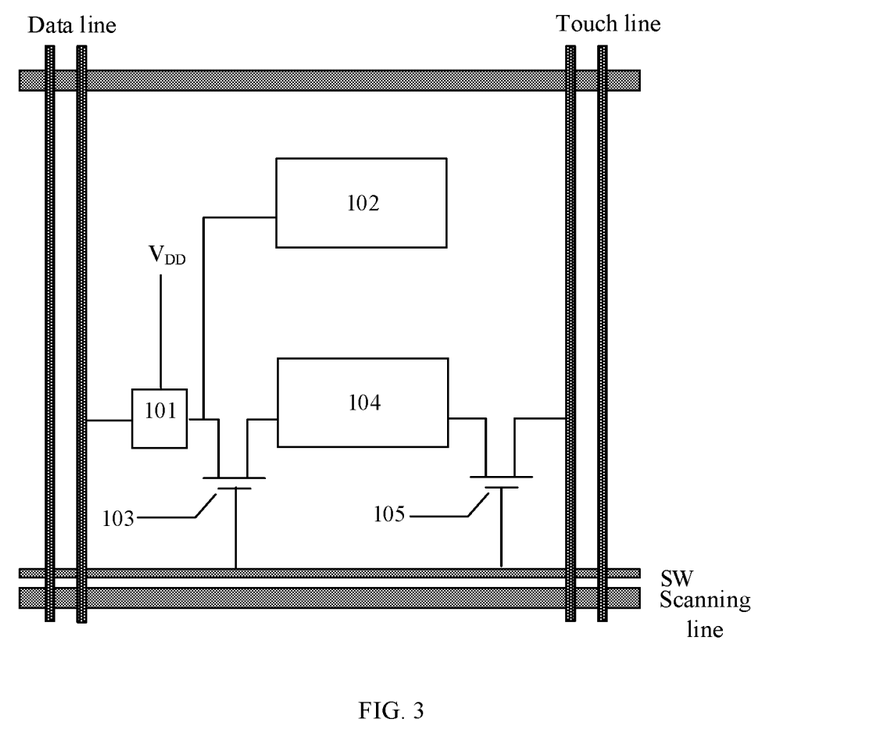
FIG. 3 illustrates a schematic diagram of a circuit structure of the subpixel unit according to an exemplary arrangement of the present disclosure.

In this exemplary arrangement, the first signal line SW1 and the second signal line SW2 may be the same signal line SW (as shown in FIG. 3), or also may be different signal lines (as shown in FIG. 3). When the first signal line SW1 and the second signal line SW2 are the same signal line SW, the first switch unit 103 and the second switch unit 105 are thin film transistors of different doping types. For example, in this exemplary arrangement, the first switch unit 103 is an N-type thin film transistor, but the second switch unit 105 is a P-type thin film transistor. When the first signal line SW1 and the second signal line SW2 are different signal lines, the first switch unit 103 and the second switch unit 105 may be thin film transistors of the same doping type. For example, in this exemplary arrangement, both the first switch unit 103 and the second switch unit 105 are N-type thin film transistors. The first light-emitting unit 102 and the second light-emitting unit 104 may be OLED light-emitting units, LED light-emitting units or LCD light-emitting units, or also may be light-emitting units frequently used in the art. The first light-emitting unit 102 and the second light-emitting unit 104 may be the same or may be different.

Figure 4A:
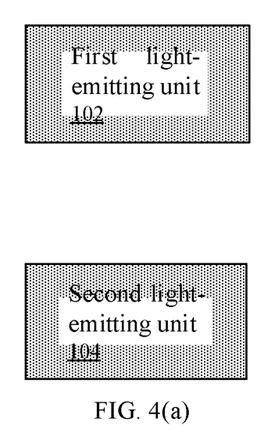
FIGS. 4(a), 4(b), 4(c), and 4(d) each illustrates a schematic diagram of arrangement of light-emitting units according to an exemplary arrangement of the present disclosure.
Figure 4B:
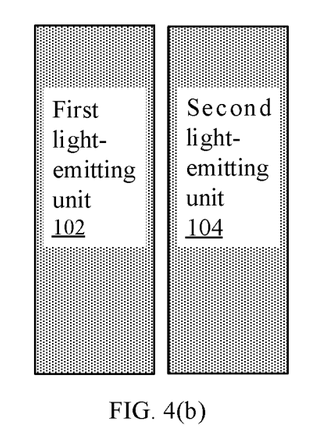
Figure 4C:
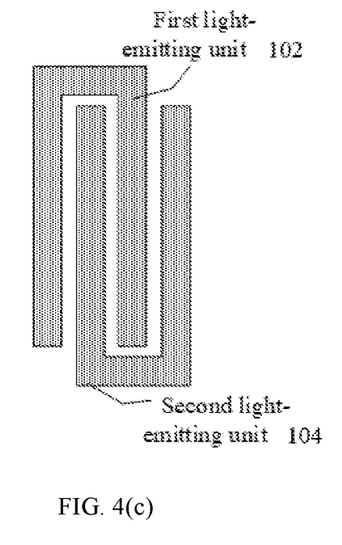
Figure 4D:
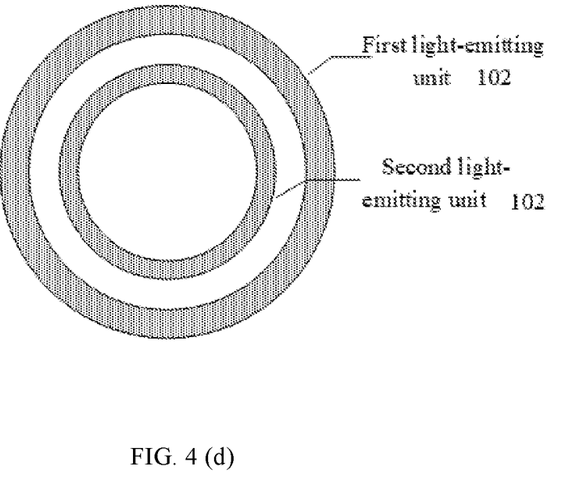

Further, the first light-emitting unit 102 and the second light-emitting unit 104 in the subpixel unit 100 may adopt a variety of arrangement modes. As shown in FIGS. 4(a), (b), (c), and (d), the first light-emitting unit 102 and the second light-emitting unit 104 may adopt a top-bottom arrangement, a left-right arrangement, a finger insertion arrangement, and a concentric circle arrangement, respectively. The above arrangement modes are merely exemplary illustrations. In this exemplary arrangement, the first light-emitting unit 102 and the second light-emitting unit 104 also may adopt other arrangement modes.

Figure 5:
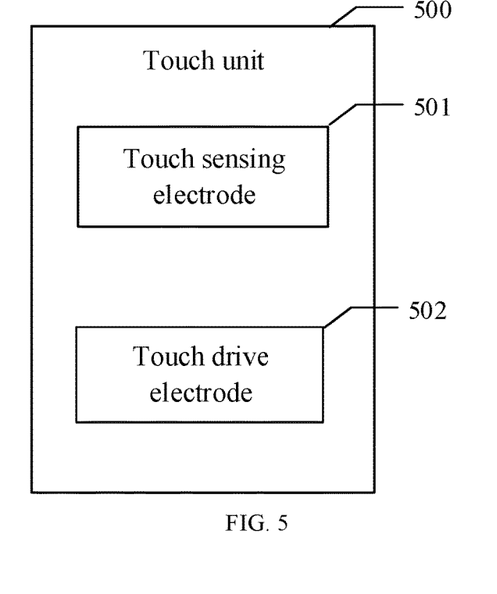
FIG. 5 illustrates a schematic structural diagram of a touch unit according to an exemplary arrangement of the present disclosure.

This exemplary arrangement provides a touch unit. FIG. 5 illustrates a schematic structural diagram of the touch unit. As shown in FIG. 5, the touch unit 500 includes a touch sensing electrode 501 and a touch drive electrode 502. The touch sensing electrode 501 and the touch drive electrode 502 may include at least one electrode of the subpixel unit 100 in the present disclosure.

Figure 6:
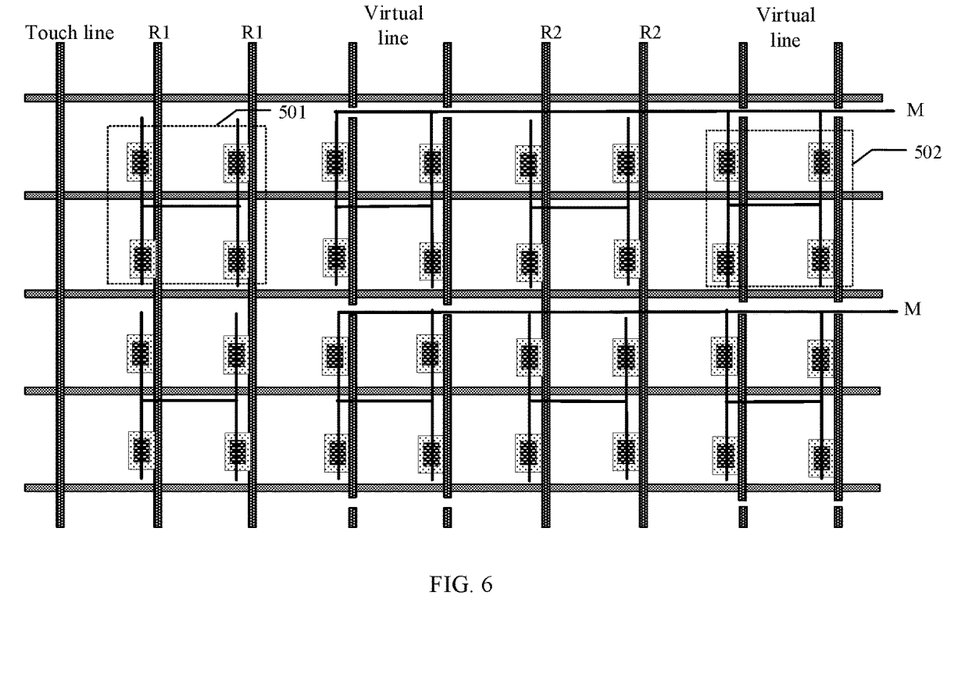
FIG. 6 illustrates a schematic structural diagram of a touch electrode according to an exemplary arrangement of the present disclosure.

FIG. 6 illustrates a schematic structural diagram of the touch unit. The touch sensing electrode 501 includes four series-connected electrodes of the subpixel unit 100, and the four series-connected electrodes are led out through touch wires (R1 and R2). The touch drive electrode 502 includes four series-connected electrodes of the subpixel unit 100, and the four series-connected electrodes are led out through a metal wire (M). The electrode of the subpixel unit 100 may be the anode of the second light-emitting unit 104. By reusing the anode, wires arranged in the panel are reduced, the thickness of the device is reduced, and thus process flows are reduced, and manufacturing costs are lowered.

Those skilled in the art should understand that FIG. 6 is merely exemplary illustration of the touch unit in the present disclosure. The touch sensing electrode 501 and the touch drive electrode 502 may further include any other number of electrodes of the subpixel unit 100, and the electrode of the subpixel unit 100 also may be the cathode of the second light-emitting unit 104. Those skilled in the art may set according to actual needs.

Figure 7:
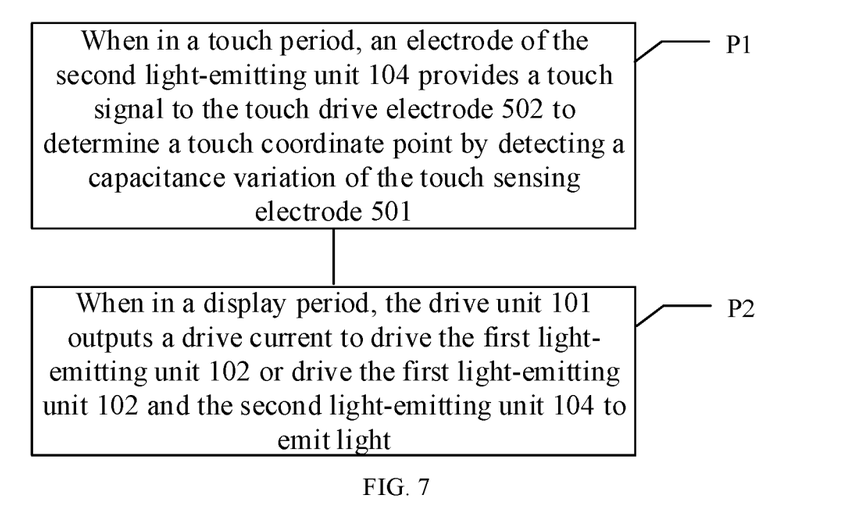
FIG. 7 illustrates a schematic diagram of a drive method according to an exemplary arrangement of the present disclosure.

This exemplary arrangement also provides a drive method, which is applied to the touch unit 500 of the present disclosure. As shown in FIG. 7, the method specifically includes blocks P1 and P2.

Block P1: when in a touch period, an electrode of the second light-emitting unit 104 provides a touch signal to the touch drive electrode 502 to determine a touch coordinate point by detecting a capacitance variation of the touch sensing electrode 501.

Block P2: when in a display period, the drive unit 101 outputs a drive current to drive the first light-emitting unit 102 or drive the first light-emitting unit 102 and the second light-emitting unit 104 to emit light.

When the touch period overlaps with the display period, namely when display and touch are synchronously implemented, the drive unit 101 outputs the drive current to the first light-emitting unit 102 based on the data signal, such that the first light-emitting unit 102 emits light; and an electrode of the second light-emitting unit 104 transmits the touch signal to the touch drive electrode 402 to determine the touch coordinate point by detecting the capacitance variation of the touch sensing electrode 401.

When the touch period does not overlap with the display period, namely when display and touch are asynchronously implemented, in the display period, the first light-emitting unit 102 and the second light-emitting unit 104 emit light under drive of the drive current outputted from the output unit 101; and in the touch period, an electrode of the second light-emitting unit 104 transmits the touch signal to the touch drive electrode 402 to determine the touch coordinate point by detecting the capacitance variation of the touch sensing electrode 401.

Figure 8:
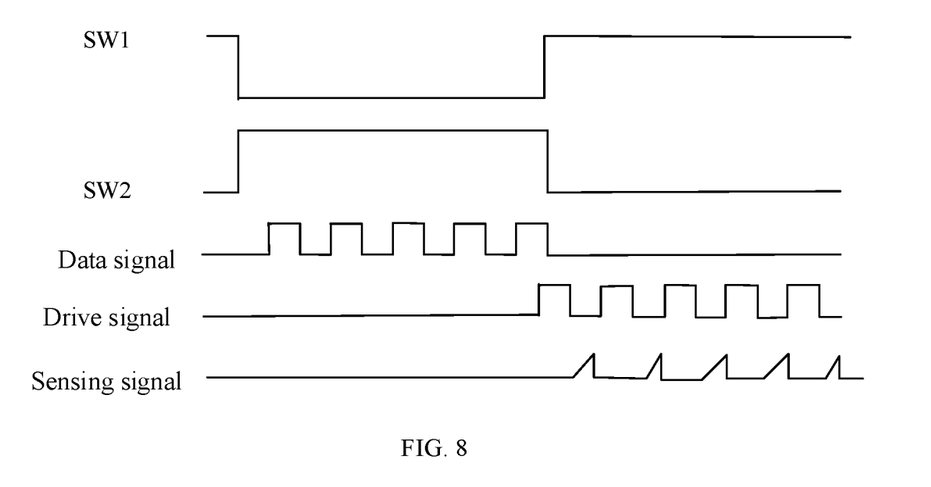
FIG. 8 illustrates a signal waveform graph of asynchronously implementing touch and display by using different signal lines according to an exemplary arrangement of the present disclosure.
Figure 9:
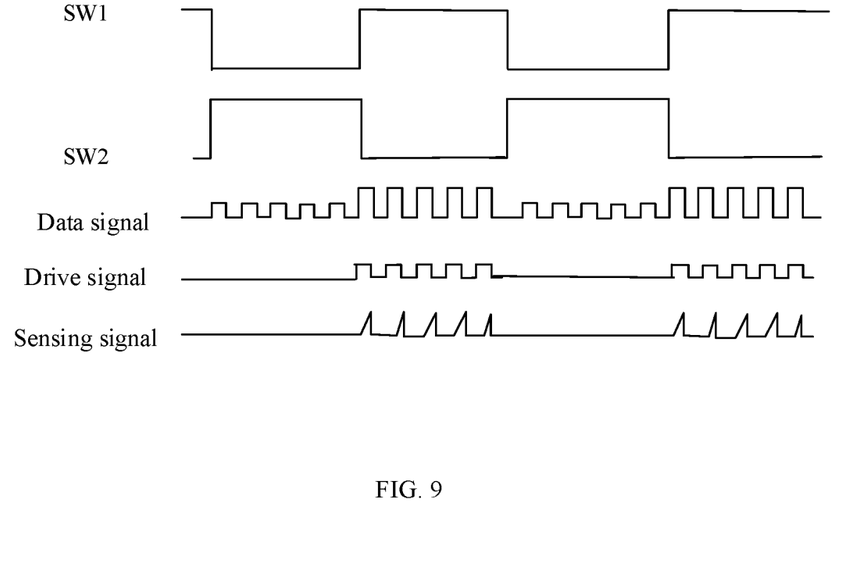
FIG. 9 illustrates a signal waveform graph of synchronously implementing touch and display by using different signal lines according to an exemplary arrangement of the present disclosure.
Figure 10:
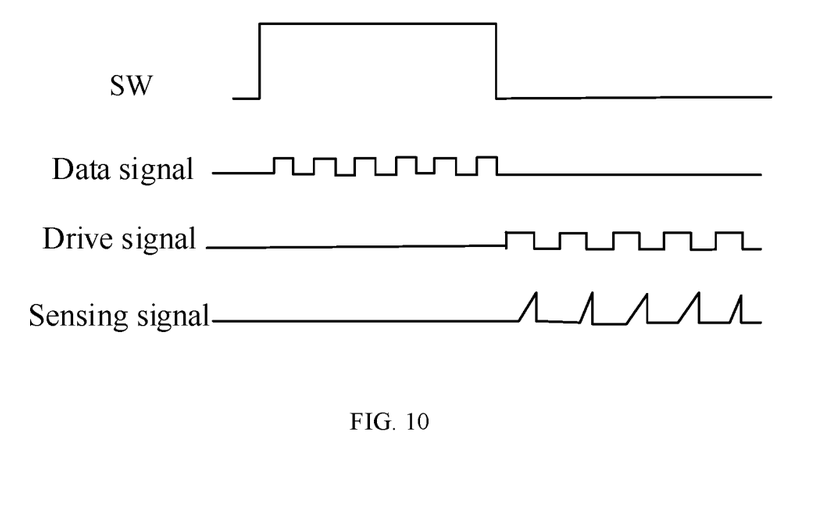
FIG. 10 illustrates a signal waveform graph of asynchronously implementing touch and display by using the same signal line according to an exemplary arrangement of the present disclosure.
Figure 11:
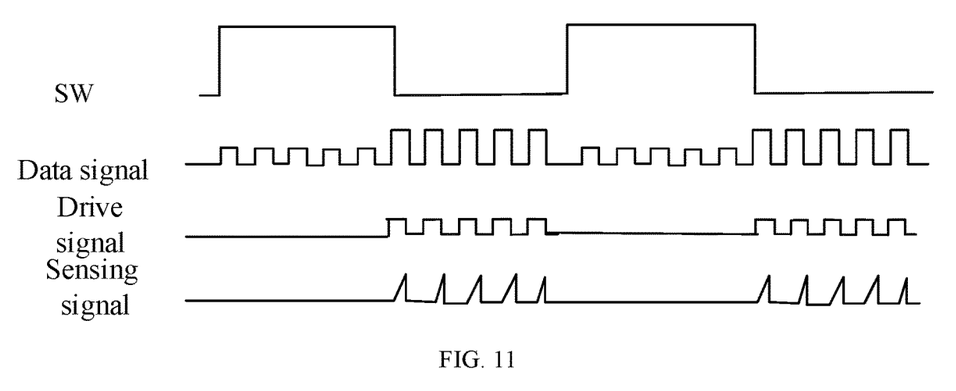
FIG. 11 illustrates a signal waveform graph of synchronously implementing touch and display by using the same signal line according to an exemplary arrangement of the present disclosure.

The first signal line SW1 and the second signal line SW2 may be the same signal line SW or may be different signal lines. FIG. 8 illustrates a signal waveform graph of asynchronously implementing display and touch by using different signal lines (SW1 and SW2). FIG. 9 illustrates a signal waveform graph of synchronously implementing display and touch by using different signal lines (SW1 and SW2). FIG. 10 illustrates a signal waveform graph of asynchronously implementing display and touch by using the same signal line SW. FIG. 11 illustrates a signal waveform graph of synchronously implementing display and touch of the same signal line SW.

In FIG. 8, when there is no touch, a display signal is provided onto a data line, the first signal line SW1 has a high level, and the first switch unit 103 is turned on; and the second signal line SW2 has a low level, the second switch unit 105 is turned off, and the drive circuit 101 provides a display drive current for the anode of the first light-emitting unit 102 and the anode of the second light-emitting unit 104, such that the first light-emitting unit 102 and the second light-emitting unit 104 simultaneously emit light. When there is touch, no display signal is provided onto the data line, the first signal line SW1 has a low level, and the first switch unit 103 is turned off; and the second signal line SW2 has a high level, the second switch unit 105 is turned on, the anode of the second light-emitting unit 104 is used as a touch electrode to make a touch detection, and a capacitance variation of the touch sensing electrode 501 is detected by providing a drive signal for the touch drive electrode 502 to determine a touch coordinate point.

In FIG. 9, when there is no touch, a display signal is provided onto a data line, the first signal line SW1 has a high level, and the first switch unit 103 is turned on; and the second signal line SW2 has a low level, the second switch unit 105 is turned off, and the drive circuit 101 provides a display drive current for the anode of the first light-emitting unit 102 and the anode of the second light-emitting unit 104, such that the first light-emitting unit 102 and the second light-emitting unit 104 simultaneously emit light. When there is touch, the display signal is still provided onto the data line, the first signal line SW1 has a low level, and the first switch unit 103 is turned off; and the second signal line SW2 has a high level, the second switch unit 105 is turned on, and the drive circuit 101 merely provides the drive current for the anode of the first light-emitting unit 102, such that the first light-emitting unit 102 emits light. To guarantee the display effect, Gamma curve matching may be implemented by increasing the drive current. The anode of the second light-emitting unit 104 is used as a touch electrode to make a touch detection, and a capacitance variation of the touch sensing electrode 501 is detected by providing a drive signal for the touch drive electrode 502 to determine a touch coordinate point.

In FIG. 10, when there is no touch, a display signal is provided onto a data line, the signal line SW has a high level, the first switch unit 103 is turned on, the second switch unit 105 is turned off, and the drive circuit 101 provides a display drive current for the anode of the first light-emitting unit 102 and the anode of the second light-emitting unit 104, such that the first light-emitting unit 102 and the second light-emitting unit 104 emit light. When there is touch, no display signal is provided onto the data line, the signal line SW has a low level, the first switch unit 103 is turned off, the second switch unit 105 is turned on, the anode of the second light-emitting unit 104 is used as a touch electrode to make a touch detection, and a capacitance variation of the touch sensing electrode 501 is detected by providing a drive signal for the touch drive electrode 502 to determine a touch coordinate point.

In FIG. 11, when there is no touch, a display signal is provided onto a data line, the signal line SW has a high level, the first switch unit 103 is turned on, the second switch unit 105 is turned off, and the drive circuit 101 provides a display drive current for the anode of the first light-emitting unit 102 and the anode of the second light-emitting unit 104, such that the first light-emitting unit 102 and the second light-emitting unit 104 emit light. When there is touch, the display signal is still provided onto the data line, the signal line SW has a low level, the first switch unit 103 is turned off, the second switch unit 105 is turned on, and the drive circuit 101 merely provides the drive current for the anode of the first light-emitting unit 102, such that the first light-emitting unit 102 emits light. Likewise, to guarantee the display effect, Gamma curve matching may be implemented by increasing the drive current. The anode of the second light-emitting unit 104 is used as a touch electrode to make a touch detection, and a capacitance variation of the touch sensing electrode 501 is detected by providing a drive signal for the touch drive electrode 502 to determine a touch coordinate point.

Figure 12:
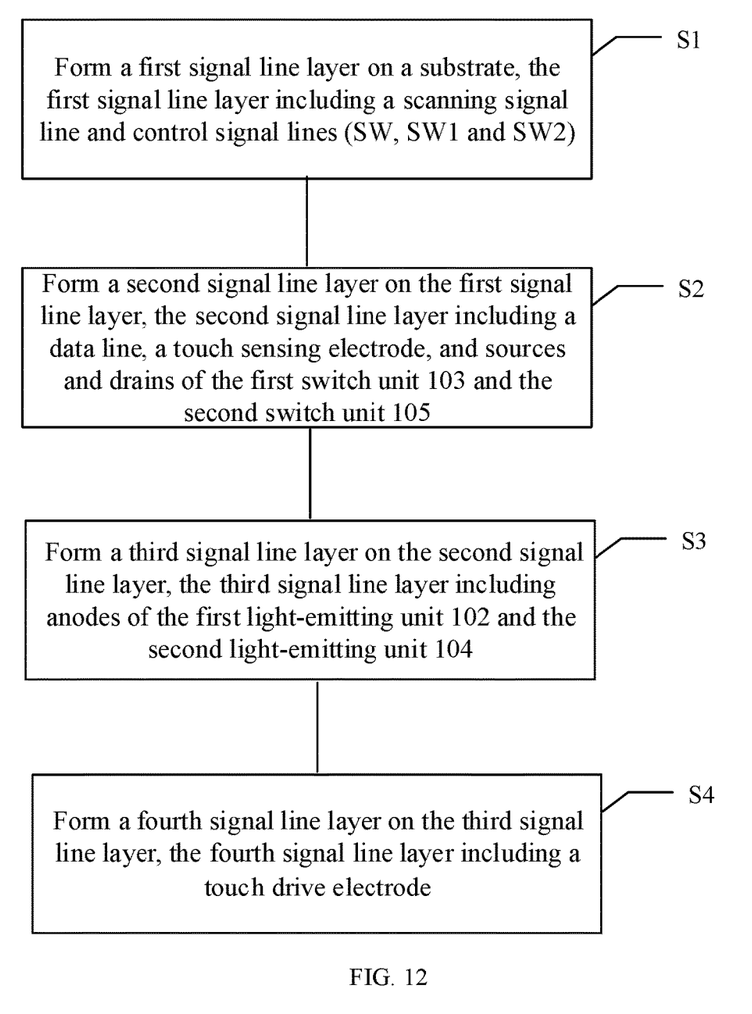
FIG. 12 illustrates a flow diagram of a processing technology of a subpixel unit according to an exemplary arrangement of the present disclosure.

In this exemplary arrangement, FIG. 12 illustrates a method for manufacturing a subpixel unit, which is applied to the subpixel unit in the present disclosure. As shown in FIG. 12, the method includes following blocks.

Block S1: forming a first signal line layer on a substrate, the first signal line layer including a scanning signal line and control signal lines (SW, SW1 and SW2).

The first signal line layer may form a first metal layer through physical vapor deposition or chemical vapor deposition process, and then the first metal layer is patterned to form patterns of scanning lines and signal lines. Electrode materials frequently used in the art may be used as the material of the metal layer. However, the present disclosure is not specifically limited thereto.

Block S2: forming a second signal line layer on the first signal line layer, the second signal line layer including a data line, a touch sensing electrode, and sources and drains of the first switch unit 103 and the second switch unit 105.

In this exemplary arrangement, the first switch unit 103 and the second switch unit 105 are thin film transistors. A second metal layer is formed on the metal layer of the scanning line, and the second metal layer is patterned to form patterns including data lines, touch lines, and sources and drains of the first switch unit 103 and the second switch unit 105. Methods for forming the second metal layer and the first metal layer and materials thereof may be the same or may be different.

Block S3: forming a third signal line layer on the second signal line layer, the third signal line layer including anodes of the first light-emitting unit 102 and the second light-emitting unit 104.

A third metal layer is formed on a source-drain layer, and the third metal layer is patterned to form patterns including the anode of the first light-emitting unit 102 and the anode of the second light-emitting unit 104. The anode of the second light-emitting unit 104 connects the drain/source of the first switch unit 103 and the second switch unit 105. Methods for forming the third metal layer, the second metal layer and the first metal layer and materials thereof may be the same or may be different.

Block S4: forming a fourth signal line layer on the third signal line layer, the fourth signal line layer including a touch drive electrode.

A metal line M is connected to the anode of the second light-emitting unit 104 under the same touch sensor and is led out to form the touch drive electrode 402. The metal line M may adopt metal having high conductivity or metal alloy materials such as copper, aluminum, gold and silver, etc. However, the present disclosure is not specifically limited thereto.

Figure 13:
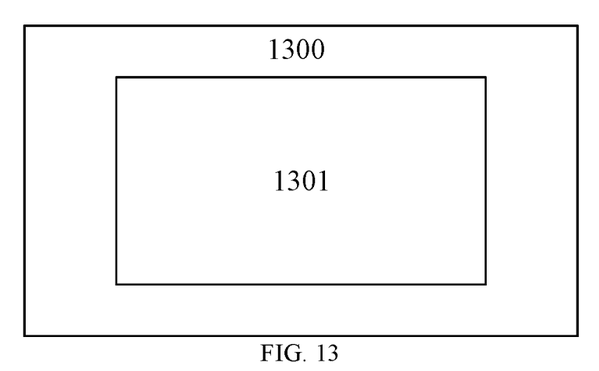
FIG. 13 illustrates a schematic structural diagram of a touch display panel according to an exemplary arrangement of the present disclosure.

This exemplary arrangement also provides a touch display panel. As shown in FIG. 13, the touch display panel 1300 includes a touch unit 1301, which is the touch unit in the present disclosure. The touch display panel 1300 may be an OLED touch display panel, an LED touch display panel or an LCD touch display panel, etc.

Figure 14:
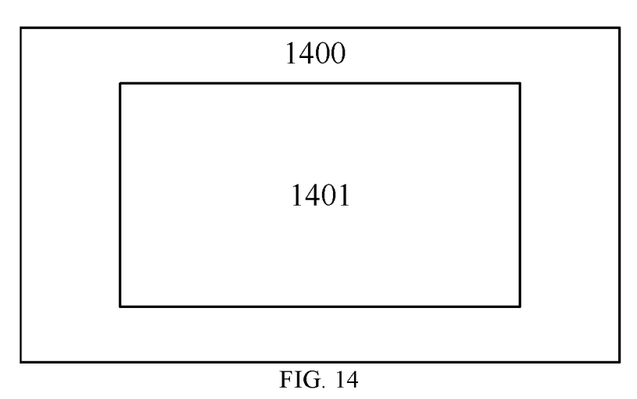
FIG. 14 illustrates a schematic structural diagram of a touch display apparatus according to an exemplary arrangement of the present disclosure.

This exemplary arrangement also provides a touch display apparatus. As shown in FIG. 14, the touch display apparatus 1400 includes a touch display panel 1401. The touch display panel 1401 is the touch display panel in the present disclosure. The touch display apparatus 1400 may be any product or component having a display function, such as a display, a mobile phone, a tablet computer, a TV set, a notebook computer, a digital photo frame, a navigation device and so on.

According to the present disclosure, the term "unit", such as a driving unit, a light emitting unit, a switching unit, etc., may be constituted by a corresponding circuit module, for example, the driving unit may include a driving circuit, a processor, an integrated circuit (IC), etc., the light emitting unit may include an OLED circuit or the like, and the switching unit may include various circuit units for performing switching control such as a switching transistor, a thyristor, and the like.

As can be seen from the above technical solutions, the subpixel unit, the touch unit, the touch display panel, and the touch display apparatus in the exemplary arrangements of the present disclosure at least have following advantages and positive effects.

The subpixel unit in the present disclosure includes a drive unit, a first light-emitting unit, a second light-emitting unit, a first switch unit, and a second switch unit. During the touch period, an electrode of the second light-emitting unit provides a touch signal to the touch drive electrode to determine a touch coordinate point by detecting a capacitance variation of the touch sensing electrode. During the display period, the drive unit outputs a drive current to drive the first light-emitting unit or drive the first light-emitting unit and the second light-emitting unit to emit light. By forming the touch unit, the touch display panel and the touch display apparatus using the subpixel unit in the present disclosure, in one aspect, the thickness of the touch display apparatus is reduced, and light transmittance of the touch display panel is increased; and in another aspect, the touch display apparatus not only can asynchronously implement touch and display, but also can synchronously implement touch and display, and thus improve the display effect and user experience. Furthermore, the process for fabricating the subpixel unit is simple, and thus fabricating costs are reduced.

Other arrangements of the present disclosure will be apparent to those skilled in the art from consideration of the specification and practice of the disclosure disclosed here. This application is intended to cover any variations, uses, or adaptations of the present disclosure following the general principles thereof and including such departures from the present disclosure as come within known or customary practice in the art. It is intended that the specification and arrangements be considered as exemplary only, with a true scope and spirit of the present disclosure being indicated by the appended claims.

It is to be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for fabricating a subpixel unit, applied to a subpixel unit, the subpixel unit comprising:
   a drive unit configured to generate a drive current based on a data signal under control of a scanning signal;
   a first light-emitting unit connected to the drive unit and configured to emit light under drive of the drive current outputted from the drive unit;
   a first switch unit connected to the drive unit and configured to be enabled under control of a first control signal to transmit the drive current;
   a second light-emitting unit connected to the first switch unit and configured to emit light under drive of the drive current outputted from the first switch unit; and
   a second switch unit connected to the second light-emitting unit and configured to be enabled under control of a second control signal to transmit a touch signal of an electrode of the second light-emitting unit, the method comprising:
forming a first signal line layer on a substrate, the first signal line layer comprising a scanning signal line and a control signal line;
forming a second signal line layer on the first signal line layer, the second signal line layer comprising a data line, a touch sensing electrode line, and sources and drains of the first switch unit and the second switch unit;
forming a third signal line layer on the second signal line layer, the third signal line layer comprising anodes of the first light-emitting unit and the second light-emitting unit; and
forming a fourth signal line layer on the third signal line layer, the fourth signal line layer comprising a touch drive electrode line.

2. The method according to claim 1, wherein
a first terminal of the first switch unit is connected with an anode of the second light-emitting unit, a second terminal of the first switch unit is connected with the drive unit, and a control terminal of the first switch unit is connected with a first signal line;
a first terminal of the second switch unit is connected with a touch wire, a second terminal of the second switch unit is connected with the anode of the second light-emitting unit, and a control terminal of the second switch unit is connected with a second signal line; and
a first terminal of a drive circuit is connected with the second terminal of the first switch unit and an anode of the first light-emitting unit, a second terminal of the drive circuit is connected with a scanning line, a third terminal of the drive circuit is connected with a data line, and a fourth terminal of the drive circuit is connected with a voltage source.

3. The method according to claim 2, wherein the first signal line and the second signal line are formed by a same signal line or different signal lines.

4. The method according to claim 3, wherein
when the first signal line and the second signal line are formed by the same signal line, the first switch unit and the second switch unit are thin film transistors of different doping types.

5. The method according to claim 1, wherein an arrangement of the first light-emitting unit and the second light-emitting unit is any one of a top-bottom arrangement, a left-right arrangement, a finger insertion arrangement, and a concentric circle arrangement.

* * * * *